United States Patent [19]

Walter

[11] Patent Number: 4,723,133
[45] Date of Patent: Feb. 2, 1988

[54] CARD EJECTING APPARATUS

[75] Inventor: Gerald N. Walter, Rochester, N.Y.

[73] Assignee: Eastman Kodak Company, Rochester, N.Y.

[21] Appl. No.: 13,988

[22] Filed: Feb. 12, 1987

[51] Int. Cl.[4] .................... G01D 15/24; G01D 15/04; B65H 29/00; B65H 31/00
[52] U.S. Cl. ........................... 346/134; 400/602; 400/625; 346/104; 271/184; 271/209
[58] Field of Search .............. 346/134, 139, 104; 271/225, 278, 279, 184, 185, 186, 187, 188, 189, 209; 400/602, 625, 626, 627, 628, 629

[56] References Cited

U.S. PATENT DOCUMENTS 3,528,074  9/1970  Cohen-Sear .................. 346/104
3,808,603  4/1974  Degreve et al. .............. 346/138
4,639,739  1/1987  Tsutsami .................... 346/134

Primary Examiner—E. A. Goldberg
Assistant Examiner—Mark Reinhart
Attorney, Agent, or Firm—Raymond L. Owens

[57] ABSTRACT

A card ejecting apparatus for a thermal printer includes a rotatable drum having a clamp which holds a card when the drum is rotated in a first printing direction and releases the card when the drum is rotated in the opposite ejecting direction, a spring having a hooked free end, a transport mechanism which receives a card as it is being ejected from the drum and drives it into the hooked free end of the spring to cock such spring, and such cocked spring propelling such card onto a stack of cards.

4 Claims, 5 Drawing Figures

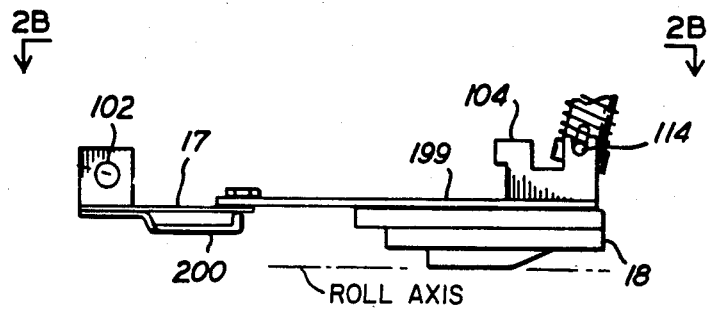
FIG. 2A
FIG. 2B
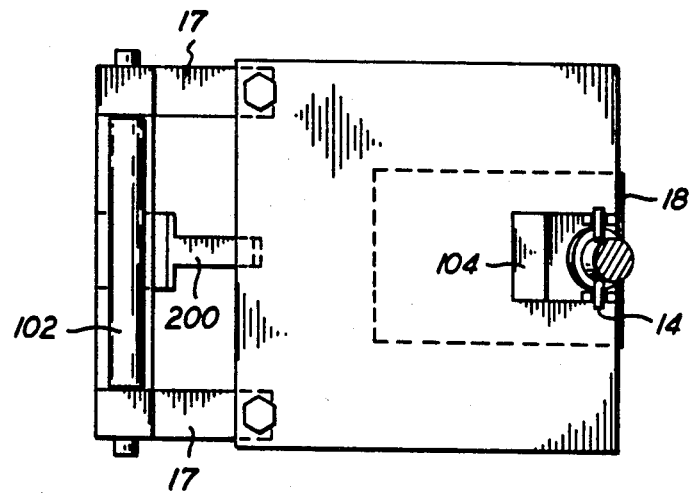

CARD EJECTING APPARATUS

FIELD OF THE INVENTION

The present invention relates to apparatus for ejecting cards from a thermal printer which uses a web-type carrier typically having a repeating series of spaced frames of different colored heat transferable dyes for printing on the card.

BACKGROUND OF THE INVENTION

In a typical thermal printer, a web-type carrier containing a repeating series of spaced frames of different colored heat transferable dyes is spooled on a carrier supply spool. The carrier is paid out from the supply spool and rewound on a take-up spool. It moves through a nip formed between a thermal print head and a dye-absorbing receiver. The receiver is in turn supported by a platen in the form of a drum. The print head engages the carrier and presses it against the receiver. The receiver may for example be an I.D. card and the print head is formed of, for example, a plurality of heating elements. When a particular heating element is energized, it is heated. In the presence of heat and pressure, dye from the carrier is caused to transfer to the receiver. The density or darkness of the printed color dye is a function of the energy delivered from the heating element to the carrier. These types of thermal printers offer the advantage of "true continuous tone" dye density transfer. This result is obtained by varying the energy applied to each heating element, yielding a variable dye density image pixel on the receiver.

The web-type carrier often includes a repeating series of spaced yellow, magenta and cyan dye frames. The carrier is typically formed of a very thin, flexible dye carrying member having a thickness that can be in the order of ¼ mil. First, the yellow frame in the carrier is moved to a position under the print head and as it is advanced. The heating elements are selectively energized to form a row of yellow image pixels in the receiver as the receiver is moved by the drum under the print head. This printer process is repeated until, line-by-line, the entire yellow dye image is formed in the receiver. Next, the magenta carrier frame is moved under the print head and the receiver is advanced to align the starting point of the yellow dye image with the print head heating elements also moved under the print head. Both the receiver and the magenta carrier frame are simultaneously moved through the nip as the heating elements are selectively energized and a magenta image is formed superimposed upon the yellow image. Finally, as the cyan dye carrier frame and the receiver dye image starting point are moved under the print head, the heating elements are selectively energized and a cyan dye image is formed in the receiver superimposed upon the yellow and magenta dye images. The yellow, magenta and cyan dye images combine to form a color image.

The term "card" as used herein, generally refers to flat flexible cards that are formed of a material that has a memory or stiffness—memory or stiffness in this disclosure refers to the ability of a flexible card when curved or bowed to return to a flat condition. Such material can be, for example, polycarbonate, polyester, or resin coated paper. Examples of cards are playing cards, ID cards, business cards, credit cards, drivers' licenses and photographic paper.

It is highly advantageous to use a thermal printer to print information on a card, such as an ID card. When printing on an ID card, such cards are arranged in a card stack and placed in a hopper. They are serially fed by a feeding mechanism from the hopper into a feed path to a rotatable drum where they are secured to the drum and are printed. In order to operate the printer with a minimized cycle time and collect the cards in a stack, an effective high speed card ejecting apparatus has to be provided. Because of the stiffness of cards, misfeeding of cards is a problem in ejecting them from a thermal printer.

SUMMARY OF THE INVENTION

Accordingly, it is an object of the invention to provide an improved apparatus for ejecting a card from a thermal printer.

This object is achieved in a thermal printer which delivers a card after a printing operation onto a stack of cards, comprising:

(a) a spring member having a hooked free end;

(b) rotatable means for driving a card after it has been printed into the hooked free end of said spring to cock said spring; and (c) said cocked spring being adapted to propel such card onto a stack of cards.

BRIEF DESCRIPTION OF THE DRAWINGS

FIG. 2A is an enlarged side view of the flexure and print head shown in FIG. 2;

FIG. 2B is a top view of the elements shown in FIG. 2A; and

MODES OF CARRYING OUT THE INVENTION

Figure 1:
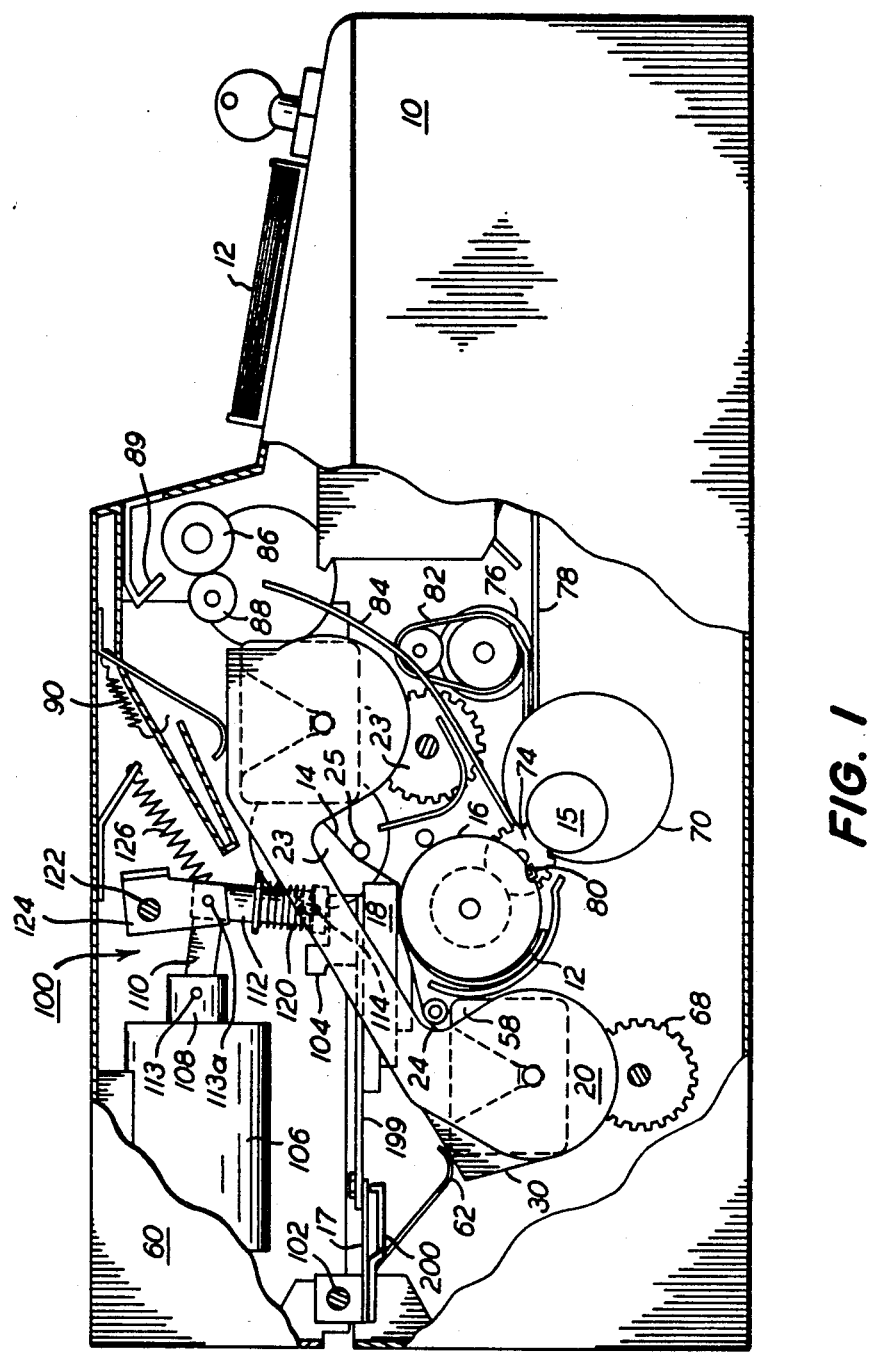
FIG. 1 is a schematic side-elevational view of a thermal printer employing one embodiment of the present invention.

Referring to FIG. 1, it can be seen that the thermal printer 10 utilizes a receiving member in the form of a card 12, which is secured by clamp 80 to a rotatable drum 16, which is mechanically coupled to a drive 15. The drive 15 continuously rotates the drum and thus feeds successive portions of card 12 past a print head 18. The print head 18 is attached to a bracket 199, which is connected to the forward end of a pivotably mounted flexure 17 made of spring steel (see also FIG. 2B). The rear end of flexure 17 is pivotably connected to the printer mainframe. As shown in FIG. 2B, the flexure 17 is in the form of a bifurcated member. During a printing cycle, the flexure is flexed and the head can be raised and lowered.

Print head 18 has a plurality of heating elements (not shown) which press a dye carrier member 14 against the receiver member 12 and forms a printing nip. The carrier member 14 is mounted in a cartridge 20 and is driven along a path from a cartridge supply spool 21 (see FIG. 3) onto a take-up spool 22 by a printer drive 23 which includes a gear 23', which drives a cartridge gear 24 on the spool 22. The drive 15 continuously advances the receiver 12 and the carrier 14 (via frictional engagement with the receiver at the printing nip) relative to the line of heating elements of the print head 18 as the heating elements are selectively energized.

The drive 23 provides carrier take up after leaving the nip. A rotating member 24 guides the carrier 14 as it leaves the supply spool 21 and enters the printing nip. This member 24 is freely rotatable to prevent scuffing or scratching of the carrier 14 prior to the printing nip. A guide member 25 guides the carrier 14 after it exits the printing nip and before it is delivered to the take-up spool 22. Member 25 need not rotate as it contacts the dye carrier after printing.

The carrier 14 can be formed of a repeating series of thermally transferable dyes. Each series may include frames of yellow, magenta and cyan dye frames. One series is used to print a full colored image in the receiver 12. In this disclosure, the term dye refers to a colored material which transfers from the carrier to a receiver in response to energy applied by the individual heating elements of the print head 18.

Figure 3:
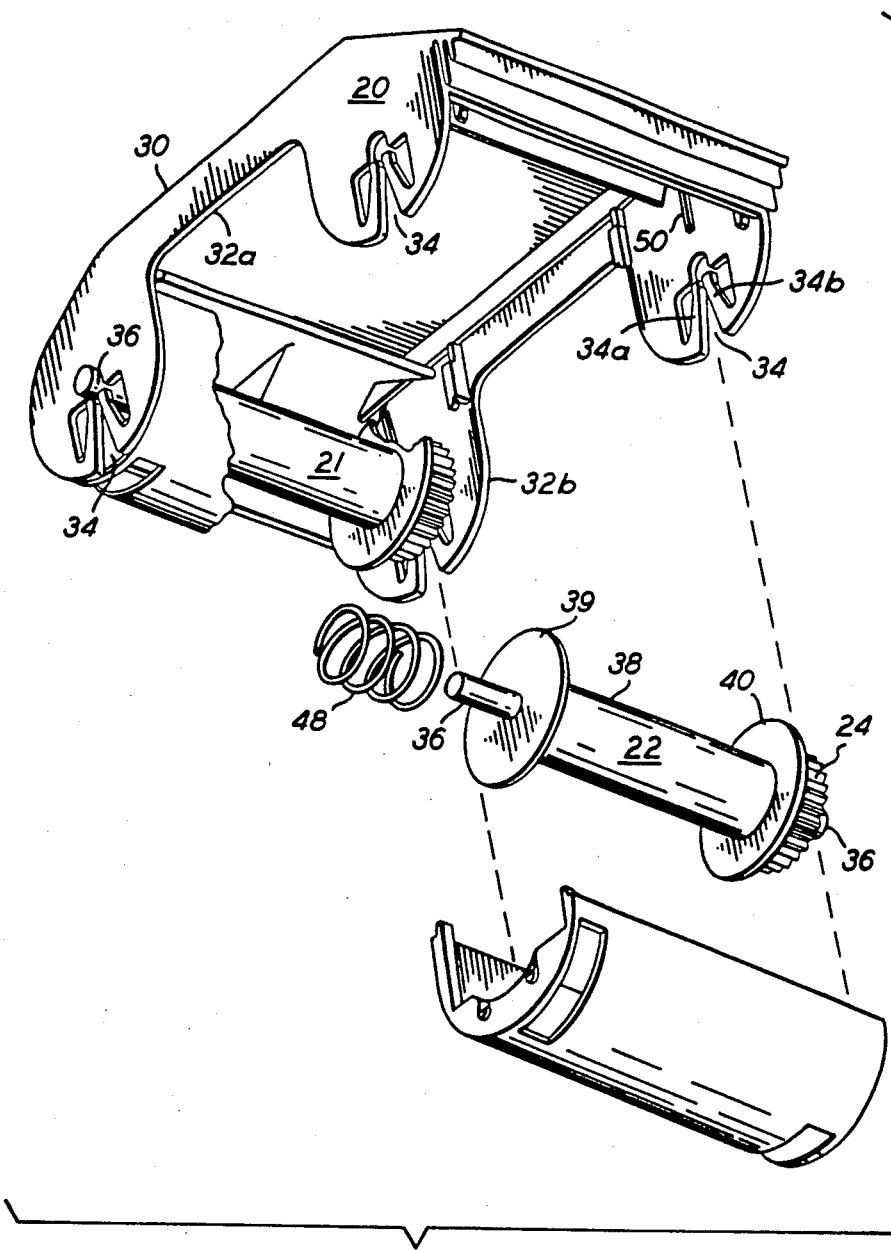
FIG. 3 is a broken away exploded perspective of the dye carrier cartridge shown in FIG. 1.

Turning particularly to FIG. 3, we see an exploded view of the cartridge 20 for the web-type carrier 14. The cartridge includes a body 30 which may be formed of injection molded plastic. The body 30 includes two pairs of identical, spaced-apart flanges 32a and 32b. Each of the flanges includes detents 34. Each detent is adapted to rotatably capture a spindle 36 of its corresponding spool. The detent 34 is composed of two integral spring members 34a and 34b which deflect apart when a spindle 36 is inserted. After insertion, the spring members return to their free position and the spindle 36 is free to rotate but is spatially retained within its corresponding flange. Both the take-up 22 and supply 21 spools are identical in construction and so only one need be described. Each of these spools includes a cylindrical portion 38 about which the web-type carrier 14 is wound. Guard members 39 and 40 are respectively secured to the opposite ends of the central portion 38. Their purpose is to align the spooled carrier 14 on the cylindrical portion 38 between them. As shown, the spindles 36 extend outwardly from their respective guide members 39 and 40 and terminate in a free end. A gear member 24 is fixed to a spindle 36 and disposed between guide member 40 and the free end of a spindle 36. The gear 24 tooth design is such that a portion extends out beyond the face of the gear in a direction parallel to the axis of spindle 36. Two adjacent teeth form a groove along the face of the gear 24 nearest to the free end of the spindle 36. A coil spring 48 urges each spool so that the face grooves of the gears 24 engage ribs 50 formed on flange 34b to prevent the spools from rotating when the cartridge is removed from the printer. This is especially advantageous during handling as it prevents the carrier 14 from unwinding.

Figure 2:
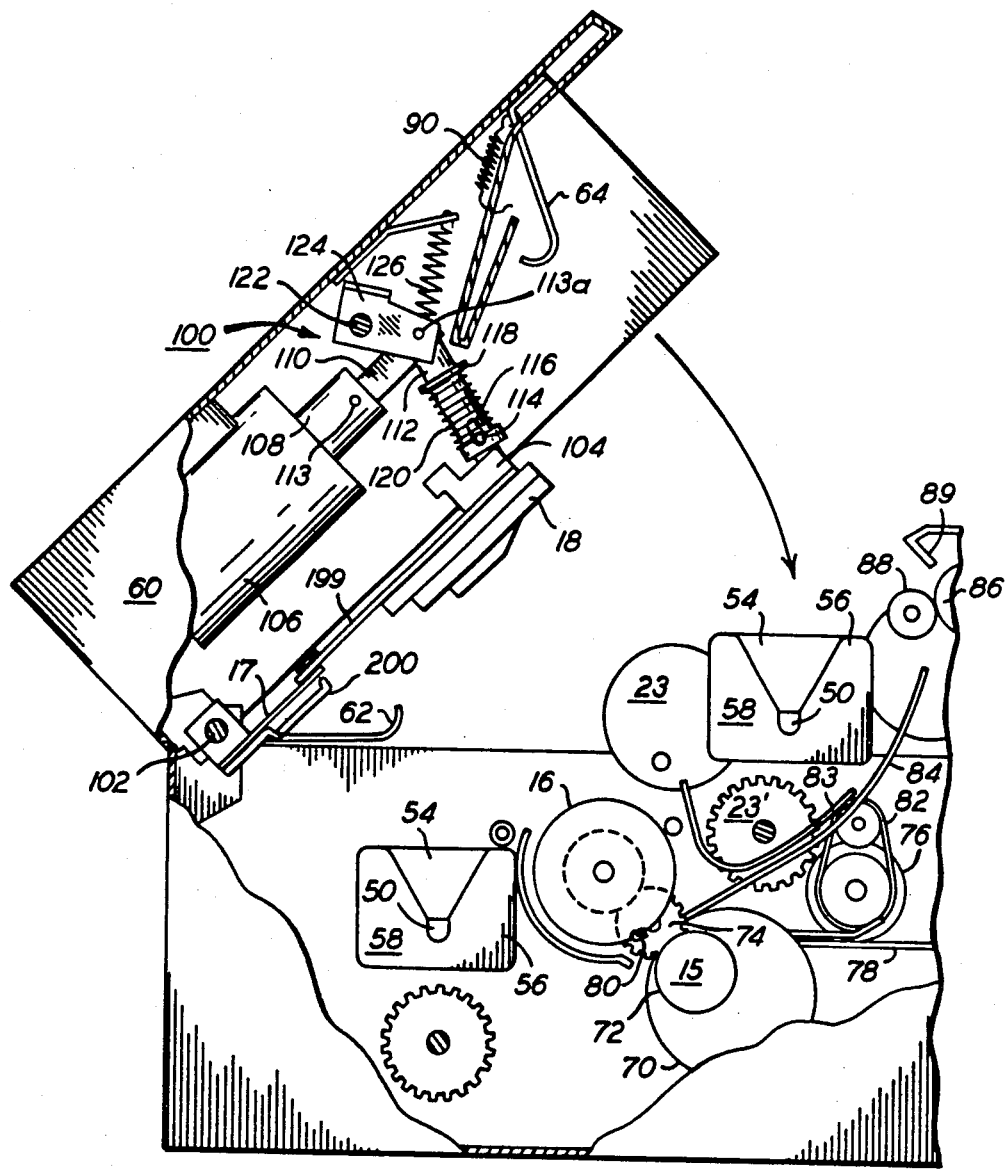
FIG. 2 is a schematic side-elevational view similar to FIG. 1 but showing the printer top open, in position to receive a cartridge of dye carrier material.

As shown in FIGS. 1 and 2 when mounting the cartridge 20, the spools are inserted into slots 50 formed in mounting blocks 58. Each mounting block 58 supports a spindle 36. There are four identical mounting blocks 58 for the four spindles 36. A top portion 60 of printer mainframe 10 is pivotable on a hinge means 102 and can be raised to its open position to insert a cartridge 20. When the cartridge 20 is inserted into the thermal printer, spindles 36 on the gear end of the two spools 21 and 22 engage a cam surface 54 on a mounting block 58 and flange 32a engages a flat surface 56 on two mounting blocks 58 to properly locate the cartridge. As the cartridge is urged by downward closing top 60, springs 62 and 64 contact the top of cartridge 20 to retain the cartridge in the located position. FIG. 1 shows this closed position with cartridge spindles 36 fully seated in slots 50. The interaction of mounting blocks 58 and the cartridge spring 48 cause the disengagement of gears 24 from ribs 50 thus unlocking the cartridge.

As shown in FIG. 1, the cartridge gears 24 mesh with printer gears 23' and 68, respectively. Advantageously the gear 68 can be made part of a drag assembly for imparting a retarding force to the supply spool 21. The drive 15 includes a motor 70 and a gear transmission assembly 72 and a drive gear 74 which rotates the drum 16. The motor 70 can selectively rotate the drum in either a print (clockwise) or eject (counter-clockwise) direction.

The thermal printer 10 also includes a receiver-feed motor (not shown) which drives a tapered rubber roller 76. The roller 76 forms a nip with a flat plate 78. The receiver card 12 is delivered by a feeder mechanism (not shown) into this nip. The card is then propelled into clamp 80 of the drum 16, which is shown in its closed position.

After the drum 16 has rotated a receiver though its three printing cycles past the print head, a colored image has been formed on the receiver 12. The motor 70 then reverses its direction of rotation and the drum 16 rotates in the eject direction. The clamp 80 opens and the card 12 is fed into a nip provided between a belt 82 and a guide member 83 in a pre-ejection path. The belt 82 is driven by a motor (not shown) and propels the receiver into another nip provided between a rubber roller 86 and a plastic idler roller 88. The card 12 is deflected by guide member 89 and driven into a hooked free end portion of a spring 90. The spring 90 is stretched as the card 12 is driven out of the nip formed by members 86 and 88. Once the trailing edge of card 12 clears such nip, the stretched spring 90 contracts and restoring force propels the card 12 out of the thermal printer print side up onto the top of a stack of cards 12 in a collection zone. The action of the guide members turns the card and so later in the eject cycle in accordance with the present invention it will be delivered print side up to a stack.

In FIG. 1, a head positioning system 100 is shown in a downward nip-pressing position. In FIG. 2, the top mainframe portion 60 is shown in a raised position to permit loading of a cartridge 20, and the mechanism 100 is shown in a retracted position, which will be explained shortly. When actively positioned by the system 100, the head 18 urges the carrier 14 and receiver 12 located between the nip of drum 16 and print head 18, into intimate contact (for printing and drive transmission).

As noted earlier, the head 18 is mounted to the bracket 199 which in turn is fixedly mounted to flexure 17. Flexure 17 is pivotally mounted on rod 102 to permit its free end to be raised and lowered. An extension 104 of the bracket 199 is connected to the mechanism 100 in the following manner. A solenoid 106 includes a movable plunger 108, which when the solenoid is energized is retracted as shown in FIG. 1. When solenoid 106 is de-energized, it is extended as shown in FIG. 2. A link member 110 is pinned to plunger 108 by a pin 113 and is pinned to loading rod 112 by a pin 113a. A pin 114 is fixed to extension 104 and rides or translates in a slot 116 formed in the loading rod 112. Attached to the rod 112 is a ring 118 which supports one end of a preloaded compression spring 120 mounted about the rod 112. The pin 114 engages the opposite end of the spring 120. The preloaded compression spring 120 compliantly urges the head downward. The hole in extension 104 is slightly larger than the diameter of pin 114. This arrangement allows the head 18 to rotate about a roll axis shown in FIG. 2B. This axis is tangent to the drum at the nip and orthogonal to the heat line formed by the heating elements of the print head at the print zone. The compliance of the flexure 17 about the axis of rod 102 permits the print head to be raised and lowered by the mechanism 100. A pin 122 extends through two spaced flanges of a U-shaped member 124 (only one face of a flange is shown). The pin is fixed into the frame of the top 60. A tension spring 126 urges the mechanism 100 to the unloaded position shown in FIG. 2 when the solenoid 106 is de-energized.

The operation of the mechanism 100 will now be described. With the top 60 shown in its raised position, the mechanism 100 is in its unloaded condition with solenoid 106 de-energized. An operator now loads a cartridge 20 and closes the top 60. Once the receiver 12 is in position under the thermal head 18, the solenoid 106 is energized and retracts the plunger 108. Link 110 is driven to the left. This causes the U-shaped member 124 to rotate in a clockwise direction and the loading rod 112 is driven downwardly against the urging of spring 126 causing the head to engage the carrier. The spring 120 drives against the pin 114 which causes the head 18 to compliantly load the carrier 14 against the receiver 12 with predetermined pressure across the width of the receiver 12.

When head 18 is in the loaded position shown in FIG. 1, and drum 16 is rotating in the clockwise print direction, a counter clockwise moment is induced on head 18. An anti-pitch support member 200 contacts the rear of mounting bracket 199 in this position and resists this counter clockwise moment by applying a vertical force at its point of contact with the center of bracket 199. This causes the head 18 to become exactly constrained in a stable pitch plane defined by the heat line or line of contact of the head with the drum 16 and the point of contact of the anti-pitching support 200 with mounting bracket 199.

A feature of the arrangement is that the head load pressure is a result of the compression of spring 120 and not the result of a fixed member. This compliance automatically adjusts for manufacturing tolerances of the print head, drum, carrier thickness, receiver thickness and positioning parts of system 100.

The load pressure is also uniform across the width of the receiver due to the compliance of the flexure 17 which allows the head 18 to roll as required to press uniformly against the dru.

The invention has been described in detail with particular reference to a certain preferred embodiment thereof, but it will be understood that variations and modifications can be effected within the spirit and scope of the invention.

I claim:

1. An apparatus for ejecting print cards from a thermal printer including a transport drum for moving such print cards along a pre-ejection path, comprising:
   (a) a spring member;
   (b) ejector means coupled to said spring member for engaging an end of a card moved by transport drum and stretching said spring member as said drum moves the print card progressively along said pre-ejection path;
   (c) means for releasing a card from said drum member at a predetermined stage of said pre-ejection drum rotation; and
   (d) means for guiding the released end of such card towards a card collection zone, whereby the restoring force of the stretched spring member moves the ejector means to move said print card to the collection zone.

2. A card ejecting apparatus for a thermal printer which delivers a card after a printing operation onto a stack of cards, comprising:
   (a) a spring member having a hooked free end;
   (b) rotatable means for driving a card after it has been printed into the hooked free end of said spring to cock said spring; and
   (c) said cocked spring being adapted to propel such card onto a stack of cards.

3. A card ejecting apparatus for a thermal printer which delivers a card after a printing operation onto a stack of cards, comprising:
   (a) a rotatable drum having a clamp which holds a card when the drum is rotated in a first direction and the card is printed and releases the card when the drum is rotated in the opposite ejecting direction;
   (b) a spring member having a hooked free end;
   (c) a guide member;
   (d) a transport mechanism which receives a card ejected from the drum and driven into the guide member which turns the card so it will be ejected print side up, from such guide member the card is hooked free end of said spring to cock such spring; and
   (e) said cocked spring being adapted to propel such card onto a stack of cards.

4. The invention as set forth in claim 3, wherein said transport mechanism includes two rotatable members which form a nip for receiving and driving a card into the hook free end of said spring.

* * * * *